United States Patent
Newton et al.

(10) Patent No.: US 11,325,131 B1
(45) Date of Patent: *May 10, 2022

(54) ANIMAL BEDDING

(71) Applicant: Custom Wood Fibers & Cedar Mulch, LLC, Stillwater, OK (US)

(72) Inventors: Aaron Newton, Stillwater, OK (US); Richard Newton, Marengo, IN (US)

(73) Assignee: Custom Wood Fibers & Cedar Mulch, LLC, Stillwater, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/371,950

(22) Filed: Jul. 9, 2021

Related U.S. Application Data

(63) Continuation of application No. 16/802,888, filed on Feb. 27, 2020, now Pat. No. 11,110,466.

(51) Int. Cl.
| | |
|---|---|
| *B02C 21/00* | (2006.01) |
| *B02C 21/02* | (2006.01) |
| *B02C 23/16* | (2006.01) |
| *B02C 13/00* | (2006.01) |
| *B02C 23/38* | (2006.01) |

(52) U.S. Cl.
CPC .............. *B02C 21/00* (2013.01); *B02C 13/00* (2013.01); *B02C 21/02* (2013.01); *B02C 21/026* (2013.01); *B02C 23/16* (2013.01); *B02C 23/38* (2013.01); *B02C 2023/165* (2013.01)

(58) Field of Classification Search
CPC ....... B02C 21/00; B02C 21/026; B02C 21/02; B02C 23/16; B02C 23/00; B02C 23/38; B02C 2023/165
See application file for complete search history.

(56) References Cited

U.S. PATENT DOCUMENTS

| | | | |
|---|---|---|---|
| 4,121,777 A * | 10/1978 | Kolstad | A01G 3/002 |
| | | | 144/24.12 |
| 4,540,032 A * | 9/1985 | Pelletier | A01G 23/003 |
| | | | 144/24.13 |
| 5,271,355 A | 12/1993 | Bilings | |
| 5,964,187 A | 10/1999 | Willis | |
| 6,619,234 B2 | 9/2003 | Sourek, Jr. | |
| 6,698,380 B2 | 3/2004 | Morrison | |
| 7,610,698 B2 * | 11/2009 | May | A01G 23/062 |
| | | | 144/24.12 |
| 7,617,798 B2 | 11/2009 | Stevenson | |
| 2003/0122004 A1 * | 7/2003 | Allen | A01G 23/093 |
| | | | 241/24.29 |

* cited by examiner

*Primary Examiner* — Faye Francis
(74) *Attorney, Agent, or Firm* — Bruce P. LaBrie; Resolution Legal Group

(57) ABSTRACT

Animal bedding is disclosed. The animal bedding comprises a juniper tree cut at ground level, the juniper tree having needles and a trunk. The juniper tree is naturally dried until the needles are brown, then ground using a screen that is 3 inches or less. The ground juniper tree is hammer milled and dust of 20 mesh minus is extracted from the hammer milled tree, which is then placed in a bagging machine and dust is vacuumed from the juniper tree. The juniper tree is then bagged.

20 Claims, 3 Drawing Sheets

ANIMAL BEDDING

CROSS-REFERENCE TO RELATED APPLICATION

This application is a continuation of application Ser. No. 16/802,888, filed Feb. 27, 2020, now U.S. Pat. No. 11,110,466 issued Sep. 7, 2021. The patent application identified above is incorporated herein by reference in its entirety to provide continuity of disclosure.

BACKGROUND

Animal bedding is used in the care of a variety of animal species such as cattle, horses, pigs, goats, and many others. The bedding provides comfort for the animals and helps keep animal pens dry and clean. Bedding often consists of wood based and grass-based products such as western cedar and straw, which can negatively impact animals based on respiratory or allergen problems.

In addition to farming for such things as dairy and food, animals of many species are judged in competitive showings. One of the most important criteria for these show animals is good health, which can manifest itself in strong musculature, healthy fur, and many other visible traits that are indicative of such good health. Bedding that helps contribute to good health is desirable for both food production and show animals.

One method employed by owners of show animals is the use of cold rooms. In order to stimulate the growth of healthy fur a room is provided that is cool and comfortable to the animals. Use of comfortable and healthy bedding in a cold room promotes the growth of healthy fur and prevents disease that would otherwise hinder good health. The bedding also helps the animals keep warm. It is to the provision of animal bedding that is helpful in these endeavors and other improvements that the present invention is directed.

SUMMARY

In one aspect, animal bedding is disclosed herein. The animal bedding comprises a juniper tree having needles, a trunk and limbs, wherein the juniper tree is cut at ground level. The juniper tree is naturally dried until the needles are brown. The juniper tree is ground using a screen that is 3 inches or less and hammer milled. The juniper tree is cleaned by extracting dust of 20 mesh minus from the hammer milled juniper tree. The juniper tree is placed in a bagging machine and dust is vacuumed from the hammer milled juniper tree and bagged. Of course, "juniper tree" can also refer to multiple trees, including their needles and trunks.

In another aspect, animal bedding is disclosed herein. The animal bedding comprises juniper trees cut at ground level. The juniper trees are naturally reduced of water content to 20% or less and ground. The juniper trees are hammer milled and cleaned by extracting dust of 20 mesh minus from the milled juniper trees. The juniper trees are cleaned by vacuuming dust from the hammer milled juniper trees and bagged.

In yet another aspect, animal bedding is disclosed herein. The animal bedding comprises juniper trees having a trunk, limbs and needles. The juniper trees are naturally dried until the needles are brown. The juniper trees are ground using a screen that is 3 inches or less. The juniper trees are hammer milled using a screen that is ⅝ inch or less and dust of 20 mesh minus is extracted from the hammer milled juniper trees. The hammer milled juniper trees are placed in a compression bagging machine and dust is vacuumed from the juniper trees. The hammer milled juniper trees are bagged in the compression bagging machine.

BRIEF DESCRIPTION OF THE DRAWINGS

The drawings included with this application illustrate certain aspects of the embodiments described herein. However, the drawings should not be viewed as exclusive embodiments. The subject matter disclosed is capable of considerable modifications, alterations, combinations, and equivalents in form and function, as will occur to those skilled in the art with the benefit of this disclosure.

DETAILED DESCRIPTION

Figure 1:
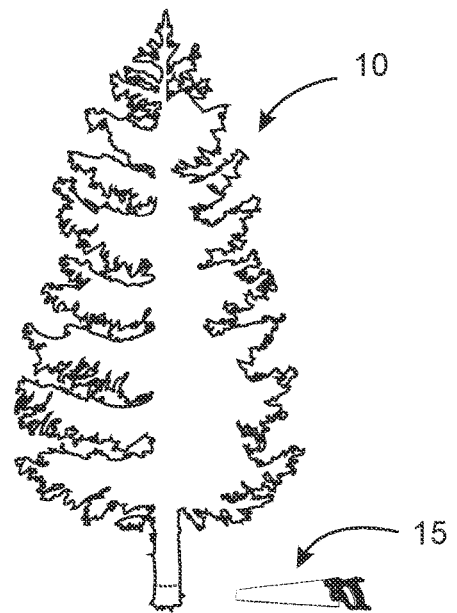
FIG. 1 is an elevational view of a juniper tree during one aspect of a method disclosed herein.

The present disclosure may be understood more readily by reference to this detailed description. Numerous specific details are set forth in order to provide a thorough understanding of the various embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein.

In one embodiment, the method of producing animal bedding disclosed herein comprises:
  a. cutting a juniper tree at ground level, the juniper tree having needles and a trunk;
  b. naturally drying the juniper tree until the needles are brown;
  c. grinding the dried juniper tree using a screen less than 3 inches;
  d. hammer milling the ground juniper tree;
  e. extracting dust of 20 mesh minus from the hammer milled tree;
  f. placing the hammer milled juniper tree in a compression bagging machine and vacuuming dust from the juniper tree; and
  g. bagging the juniper tree.

As used herein and in the appended claims, a "juniper tree" means a coniferous tree or shrub in the genus *Juniperus* of the cypress family Cupressaceae. For example, a species of the *Juniperus* genus is *Juniperus Virginiana*, which is also known by names such as red cedar, eastern red cedar, and aromatic cedar (although not a cedar, which is instead in the pine family).

As used herein and in the appended claims, "ground level" means approximately at the level of the growing medium from which the tree grows but may vary somewhat based on the method of cutting and the saw operator. For example, the use of a chainsaw to cut a tree is effective, but chainsaw operators typically avoid contacting ground and dirt with a chainsaw due to potential damage to the saw and chain, so they often leave a small portion above ground level. Based on the size of the tree that is cut, the remaining part of the tree often rises over time because the weight of the tree has been removed and no longer provides a force on the subterranean part of the tree.

As used herein and in the appended claims, "cutting" means any variety of means of cutting a tree trunk or branch, such as a saw, clippers, industrial equipment, specialized cutting tools and vehicles, and any other method of removing all or part of a tree. For example, in addition to a chainsaw as mentioned, specialized industrial saws can be fitted on a skid steer or other mobile equipment for tree cutting and/or removal. Other examples include bull dozers and heavy equipment that removes trees. Some equipment allows the tree to be cut slightly below the surface of the ground, while for others it is preferable to cut above the ground.

As used herein and in the appended claims, "needles", "limbs" and a "trunk" refer to parts of the tree for use in the method disclosed. For example, needles can be leaves of a tree of the sharp or spreading variety, and a trunk is typically the wooden central portion of a tree. Large limbs or branches can also be considered a trunk, as the distinction is not significant, such as when comparing the trunk of a small tree and a branch or limb of a large tree.

As used herein and in the appended claims, "naturally drying" refers to a process of allowing natural processes to eliminate water from the tree. For example, the water content of trees can be in excess of 50%, although this amount can vary by tree, season, and climate. Allowing a cut tree to remain in a field or other outdoor or indoor area for a period of time causes moisture from the tree to evaporate, thereby reducing the moisture content. Natural drying is unlike kiln drying or using some other artificial technique to reduce the moisture content. Measuring the moisture of the tree is not necessary, as the moisture content is typically acceptable when the needles or leaves have turned brown. A suitable water content is about 20% for the purpose of the method herein. For example, leaving a tree in a field for three months or more can make the needles brown and reduce the water content to 20% or less.

As used herein and in the appended claims, "grinding" the dried juniper tree is typically done using a mechanical chopping device or grinder to create small pieces of the tree. For example, Rotochopper® Inc. manufactures a variety of equipment suitable for grinding trees. The size of the ground pieces can be determined based on the use of baffled screens of various sizes. For example, a three-inch screen can be used that will only allow pieces of the tree that are three inches or smaller to pass through the equipment. Other size screens, such as 2.5 inches can be used to only allow ground pieces that are 2.5 inches to pass through.

As used herein and in the appended claims, "hammer milling" is a process by which the ground tree is further reduced in size. For example, the hammer milling process can use screens that will allow only a particular size or smaller to pass through the screen. For example, using a half inch screen will allow only pieces of the trees that are a half inch or smaller to pass through the hammer milling equipment. For example, using a seven sixteenths inch screen will only allow pieces of the tree that are smaller than seven sixteenths inch to pass through the hammer milling equipment.

As used herein and in the appended claims, "extracting dust" means the use of air handling equipment to remove dust from the hammer milled trees. For example, use of a plenum and a baghouse can pull fine particles of dust off the hammer milled trees using a cyclone with the plenum and a vortex within the baghouse created by a fan or blower and an associated motor. Particulate gathers on filters and accumulates as waste product separated from the hammer milled trees. The designation "20 mesh minus" refers to a screen that includes twenty openings in one linear inch of the screen. The "minus" means that all the particles of the designated mesh size would pass through the screen or filter. One problem with the mesh designation is that screens can be constructed of different size wire or other substance that creates differences in the holes for particulate to pass through. Standardized mesh designations therefore can solve the inconsistent measurement of particle size. For example, 20 mesh permits particles that are about 850 microns and smaller to pass. The screens and filters can be constructed of a variety of materials. For example, the screens and filters can be constructed of wire, fabric, or any other material that can be used to construct a screen or filter.

As used herein and in the appended claims, "bagging machine" or "bagger" means equipment used for placing a material in a bag. For example, the hammer milled tree can be placed in a bag constructed of plastic or other material. As another example, the hammer milled tree can be compressed into a particular shape consistent with the shape of the bag. It may be desirable to vacuum dust from the hammer milled tree within the bagging machine, either before, during, or after bagging. For example, one or more locations within the bagging machine can include vacuum ports to which air handling equipment is attached to vacuum dust from the hammer milled tree, thereby taking additional dust from the processed tree.

Figure 2:
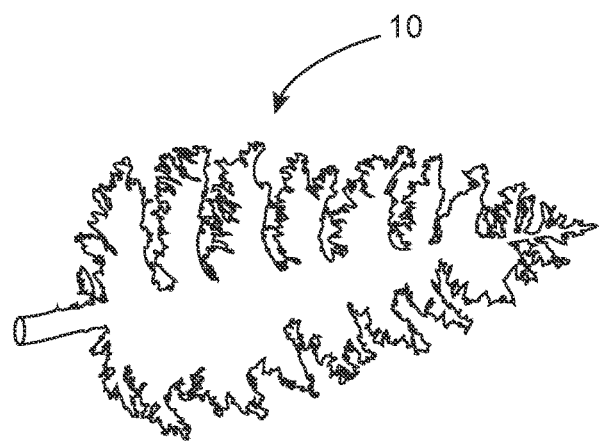
FIG. 2 is an elevational view of the juniper tree shown in FIG. 1 during another aspect of a disclosed method.

Referring now to FIGS. 1 and 2 of the drawings, one embodiment of the method disclosed herein will be described. Shown therein is a tree 10, preferably a juniper tree, in a step of the method herein. In FIG. 1, the tree 10 is shown upright as in a growing position. A saw 15 is shown to indicate that the tree 10 is to be cut from its upright position in the ground as indicated in FIG. 1 to another position such as laying down. As suggested above, the saw 15 can be of many forms as needed or desired to cut the tree 10 from its growing position, such as a chainsaw or other specialty equipment designed for cutting the tree 10.

In FIG. 2, the step of naturally drying the tree 10 until the needles of the tree 10 are brown is shown in a presently preferred embodiment. Although the color of the needles generally indicates whether the tree 10 is sufficiently dried pursuant to the method herein, the brown color of the needles typically coincides with a water content of about 20% or less. The brown color and the desired water content usually take place after three to six months of natural drying.

Figure 3:
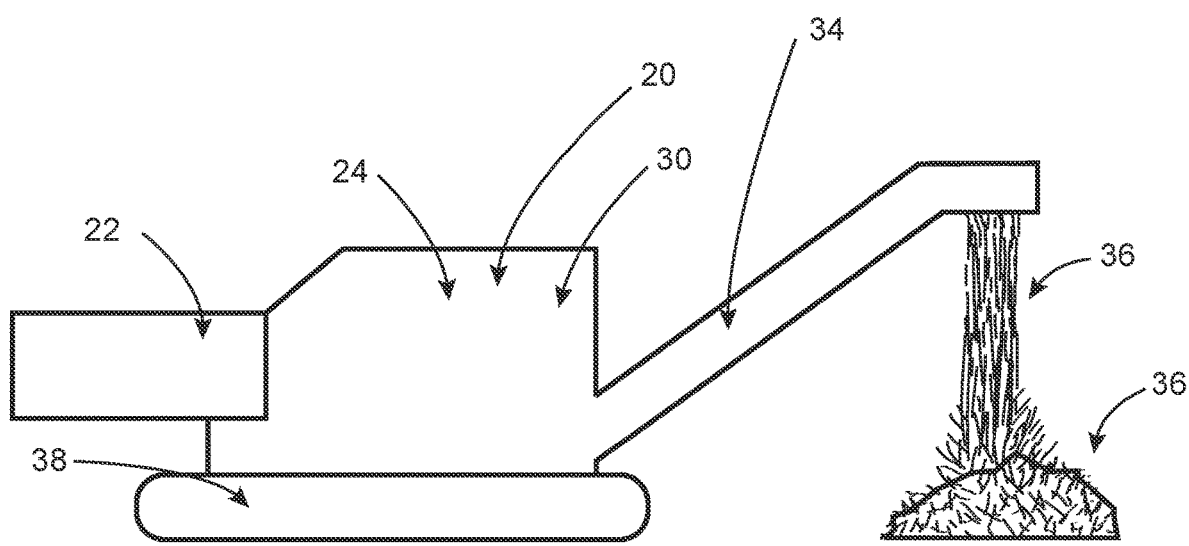
FIG. 3 is an elevational view of a grinder in one aspect of a disclosed method.
Figure 4:
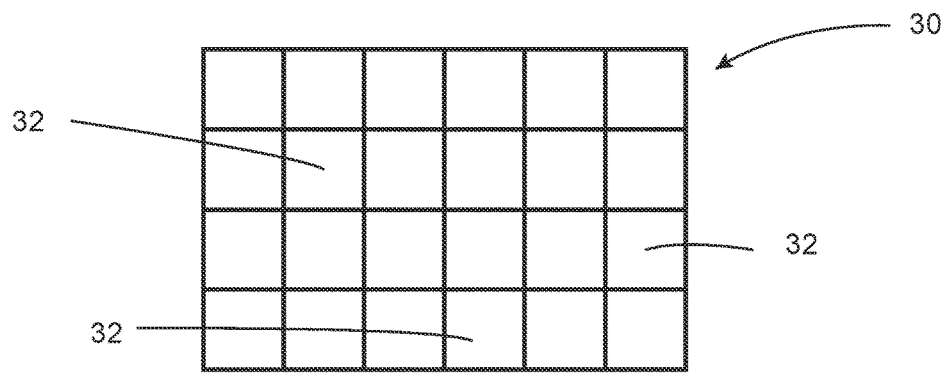
FIG. 4 is a view of a screen for use in the grinder such as that of FIG. 3.

Referring now to FIG. 3, after the tree 10 is sufficiently dried the step of grinding the tree 10 takes place with the grinder 20. In a presently preferred embodiment, the grinder 20 includes a loading bin 22 that includes a conveyer. As the dried tree 10 is placed in the loading bin 22 the conveyer moves the dried tree 10 to a pulverizer in which the tree 10 is repeatedly ground until the pieces are of a sufficient size. In a presently preferred embodiment, the tree 10 is ground into pieces that are approximately 3 inches or less. Referring also to FIG. 4, shown therein is a screen 30 with openings 32. The screen 30 resides in the grinder 20 and permits ground pieces of the tree 10 that are smaller than the openings 32 to pass. For example, a screen with openings 32 that are three inches permit only pieces of the tree 10 that are three inches or smaller to pass through the screen 30. It should be known that the screen 30 is shown as a planar screen, but that many shapes and orientations can be useful depending on the design of the grinder 30. Additionally, baffles within the grinder 30 help to recirculate pieces of the ground tree 10 until such pieces can pass through the screen. The baffles also minimize the production of dust.

Referring still to FIG. 3, after pieces of the tree 10 pass through the screen 30, they are moved by conveyer 34 and exit the grinder 20. In a presently preferred embodiment, pieces of the ground tree 10 exit the grinder 20 as mulch 36 or a mulch-like substance. After this step the tree 10 is preferably ready for a variety of uses, such as garden mulch or other desired uses.

In another presently preferred embodiment, the grinder 20 includes tracks 38 that allow the grinder 20 to be mobile. It is not necessary that the grinder 20 includes tracks, as it can be moved in other ways, such as self-propelled wheels, pulled as a trailer, or it can even be immobile, with the trees 10 shipped to its location for grinding.

Figure 5:
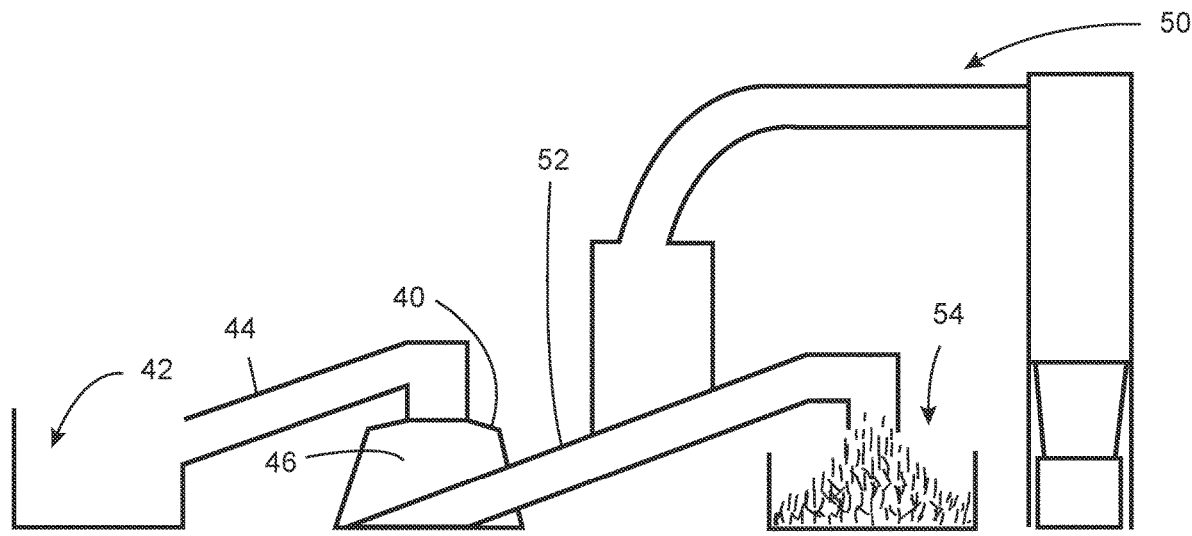
FIG. 5 is a schematic view illustrating use of a hammermill and a baghouse in association with one embodiment of a method disclosed herein.
Figure 6:
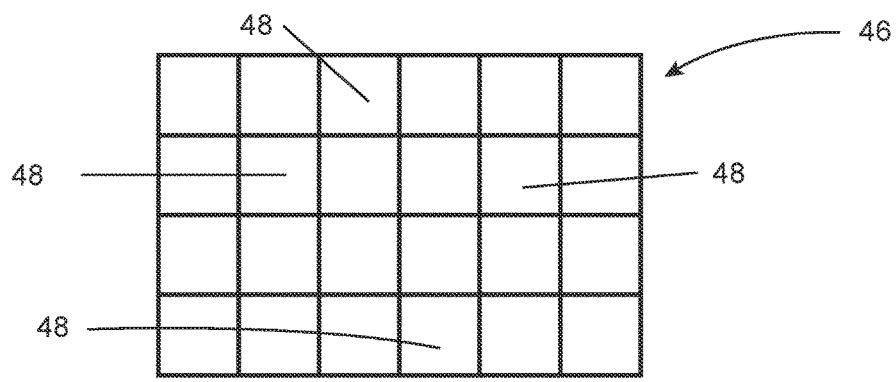
FIG. 6 is a view of a screen for use in a hammermill such as that in FIG. 5.

Referring now to FIG. 5, shown therein is a hammer mill 40 and a baghouse 50. In the hammer milling step, a bin 42 is loaded with the ground trees 10, where a conveyer 44 moves the ground tree 10 into the hammer mill 40. Referring also to FIG. 6, a hammer mill screen 46 with holes 48 resides within the hammer mill 40, where the tree 10 is further processed into a finer particle size. In a presently preferred embodiment, the holes 48 in the hammer mill screen 46 are one half inch and permit particles of the tree 10 that are one half inch or smaller to pass through the holes 48. After the particles pass through the screen 46, the hammer milled tree 10 travels via the auger 52 toward bedding bin 54. In the extracting step a cyclone pulls dust from the hammer milled tree at the plenum 55 by a blower at the baghouse 50. The cyclone has the added benefit of clearing the hammer mill screen 46 during operation.

Still referring to FIG. 5, the dust pulled off the hammer milled tree 10 is blown toward the baghouse 50. In a presently preferred embodiment, a vortex is formed in the baghouse 50 that pulls dust from the hammer milled tree 10. In one preferred embodiment, the vortex is formed with the use of a 20 hp motor with a 36-inch fan. In another presently preferred embodiment, the motor includes variable speed controls to vary the power of the vortex. A very fine particulate is extracted in the baghouse from the processed tree 10. For example, with appropriately sized filters in the baghouse as discussed above, dust of a size approximately 20 mesh minus is extracted from the processed tree 10. Finer or courser dust can also be extracted by adjusting the fan speed and the baghouse filter size.

Figure 7:
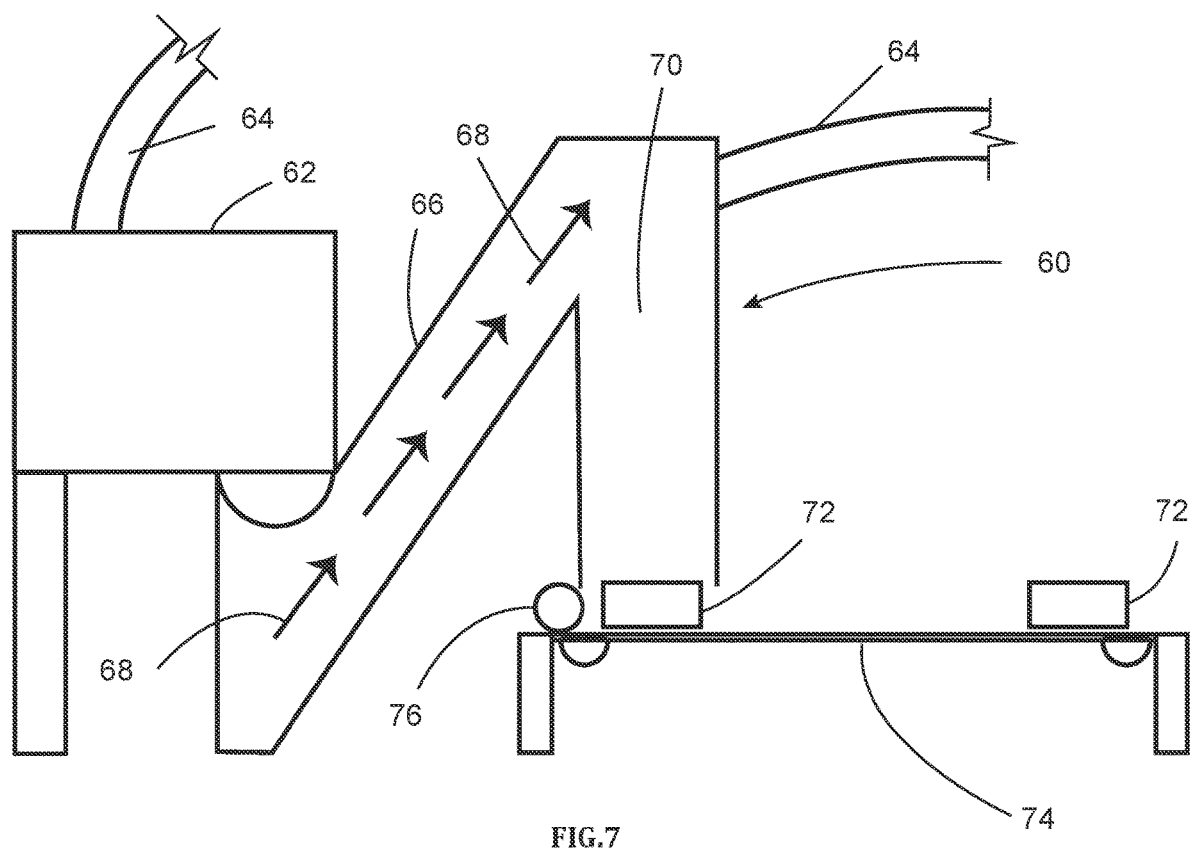
FIG. 7 is a bagging machine in association of one embodiment of a method disclosed herein.

Referring to FIG. 7, shown therein is bagger 60 for use in the vacuuming step and the bagging step. The bagger 60 includes a bagging bin 62 and ducts 64. Hammer milled trees 10 are moved from the bedding bin 54 (see FIG. 5) to the bagging bin 62. The processed trees 10 then enter the conveyer 66 along arrows 68 to the compactor 70. In a presently preferred embodiment, the ducts 64 are attached to air handling equipment (not shown) to create a vacuum or suction, thereby vacuuming dust from processed trees 10. Although two ducts 64 are shown in FIG. 7, the present invention is not so limited, as more or fewer ducts can be added to vacuum dust from the processed trees 10. For example, additional ducts could be added to the bagging bin 64, the conveyer 66, and the compactor 70.

Still referring to FIG. 7, in a presently preferred embodiment the processed trees 10 enter the compactor 70 and are formed into bales such as shown by reference number 72. After the processed trees 10 are compacted into bales 72, each bale drops out of the compactor 70 onto the conveyer 74. A roll of bags 76 is preferably located adjacent to the compactor 70 so that the bales 72 are placed in the bags and moved along the conveyer 74 to be prepared for use and transport.

Thus, by using the disclosed method, bedding is produced that minimizes dust and allergens, creates efficiencies in the production of bedding and other materials during the process, and creates a clean and healthy product for use in a variety of activities, including animal related activities that promote robust growth and overall good health. The steps are designed to extract, vacuum, filter, and avoid the presence of dust and particulate in the products produced. All of the tree, produced product, and waste product is used or usable. Different products can be derived during the process for different uses.

What is claimed is:

1. A system for producing animal bedding, the system comprising:
   a cutter to cut a juniper tree at ground level, the juniper tree having needles, a trunk and limbs, wherein the juniper tree is naturally dried until the needles are brown;
   a grinder to grind the dried juniper tree, the grinder having a screen with a 3 inch opening or less to limit the ground juniper tree from passing;
   a hammer mill to process the ground juniper tree;
   a cleaner to extract dust of 20 mesh minus from the hammer milled juniper tree;
   a bagging machine in which dust is vacuumed from the hammer milled juniper tree and the juniper tree is bagged.

2. The system of claim 1, wherein the juniper tree is a *Juniperus virginiana*.

3. The system of claim 1, wherein the juniper tree is ground with the needles, trunk and limbs.

4. The system of claim 1, wherein the juniper tree is dried until the water content is 20% or less.

5. The system of claim 1 wherein the hammer mill includes a screen having an opening of ½ inch or less to limit the processed juniper tree from passing.

6. The system of claim 1, wherein the dust is extracted using a cyclone and a baghouse.

7. The system of claim 6, wherein the baghouse includes a motorized fan to extract the dust.

8. A system for producing animal bedding, the system comprising:
   a cutter to cut juniper trees at ground level wherein the juniper trees are naturally reduced of water content to 20% or less;
   a grinder to grind the dried juniper trees;
   a hammer mill to process the ground juniper trees;
   a cleaner to extract dust of 20 mesh minus from the hammer milled juniper trees;
   a bagger that vacuums dust from and bags the hammer milled juniper trees.

9. The system of claim 8 wherein the water content is reduced by laying the cut juniper trees on the ground.

10. The system of claim 8 wherein the juniper trees are a *Juniperus virginiana*.

11. The system of claim 8, wherein the grinder includes a screen with a 3 inch opening or smaller to limit the ground juniper tree from passing.

12. The system of claim 8, wherein the hammer milled juniper trees are bagged using a compression bagger.

13. The system of claim 8, wherein the dust is extracted using a baghouse vortex.

14. A system for producing animal bedding, the system comprising:
   juniper trees having a trunk, limbs and needles, wherein the juniper trees are naturally dried until the needles are brown;
   a grinder to grind the dried juniper tree, the grinder having a screen with a 3 inch opening or less to limit the ground juniper trees from passing;
   a hammer mill to process the ground juniper trees, the hammer mill having a screen with a ⅝ inch opening or less to limit the processed trees from passing;
   a cleaner to extract dust of 20 mesh minus from the hammer milled juniper trees;
   a compression bagging machine in which dust is vacuumed from the hammer milled juniper trees and the juniper trees are bagged.

15. The system of claim 14, wherein the juniper trees are dried for at least 3 months.

16. The system of claim 14, wherein the cleaner extracts dust from the hammer milled juniper trees using a vortex.

17. The system of claim 14 wherein the bedding is packaged as a compressed bale.

18. The system of claim 14 wherein dust is vacuumed from the hammer milled juniper trees in the compression bagging machine at more than one location.

19. The system of claim 14, wherein the dust is extracted from the hammer milled juniper trees using a baghouse.

20. The system of claim 19, wherein the baghouse includes a fan to extract the dust.

* * * * *